Figure 1:
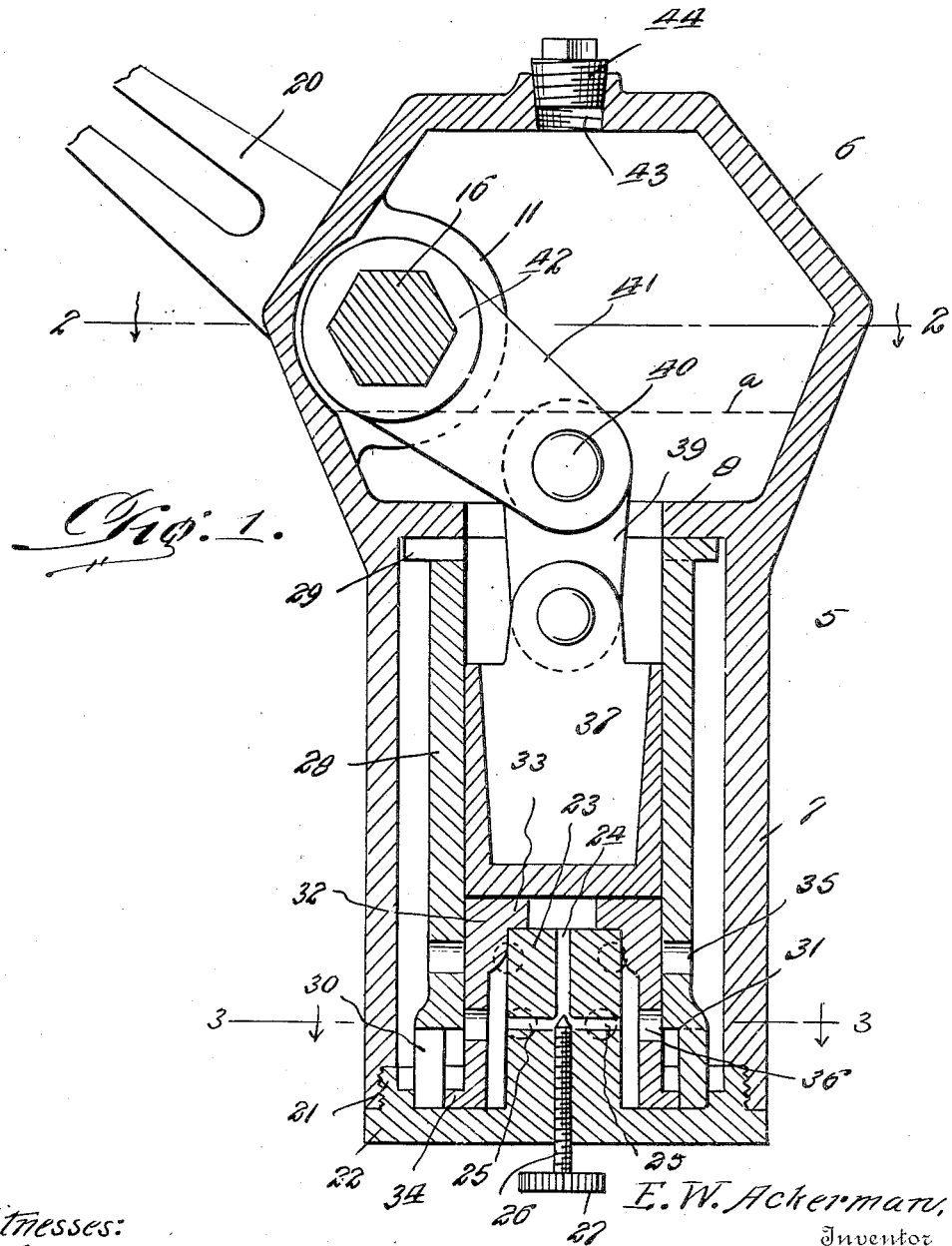

Dec. 4, 1923.

E. W. ACKERMAN 1,476,352

SHOCK ABSORBER

Filed April 4, 1923

2 Sheets-Sheet 1

Dec. 4, 1923.

E. W. ACKERMAN

SHOCK ABSORBER

Filed April 4, 1923

1,476,352

2 Sheets-Sheet 2

Witnesses:
F. L. Fox
N. Berman

E. W. Ackerman,
Inventor

Clarence A. O'Brien
Attorney

Patented Dec. 4, 1923.

1,476,352

UNITED STATES PATENT OFFICE.

ERNEST W. ACKERMAN, OF MONROE, MICHIGAN.

SHOCK ABSORBER.

Application filed April 4, 1923. Serial No. 629,762.

*To all whom it may concern:*

Be it known that I, ERNEST W. ACKERMAN, a citizen of the United States, residing at Monroe, in the county of Monroe and State of Michigan, have invented certain new and useful Improvements in Shock Absorbers, of which the following is a specification.

The primary object of my invention resides in the provision of a shock absorber that is well adapted to be applied to practically all types of motor vehicles, the same being of such a nature as to effectively overcome the quick rebound of the vehicle springs for preventing the consequently snapping or breaking of these springs, and for preventing the jolting of the occupants of the vehicle.

A further object of my invention resides in the provision of such a shock absorber that will effectively perform the above ascribed objects, the device embracing at the same time the desired features of simplicity, durability and efficiency, the same comprising relatively few parts, and these so correlated as to reduce the liability of derangement to a minimum.

The nature and advantages of the invention will be better understood when the following detailed description is read in connection with the accompanying drawings, the invention residing in the construction, combination, and arrangement of parts as claimed.

Figure 2:
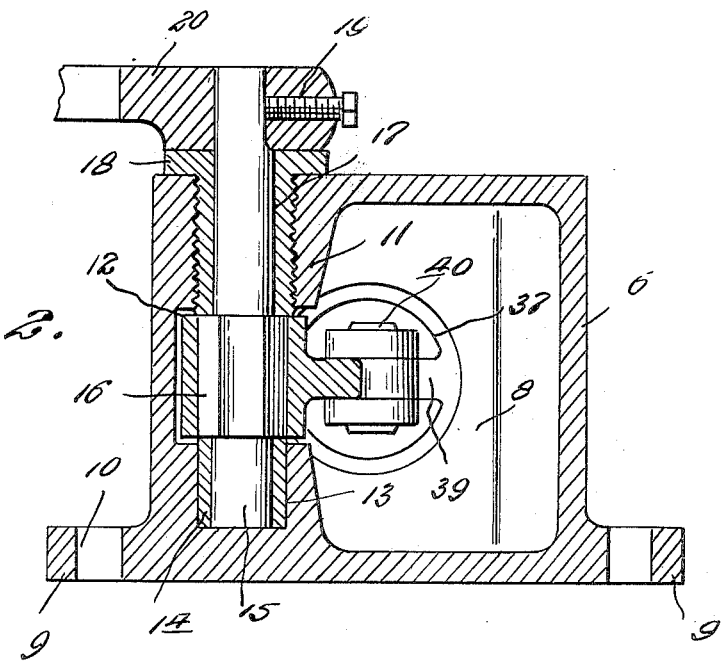
Figure 3:
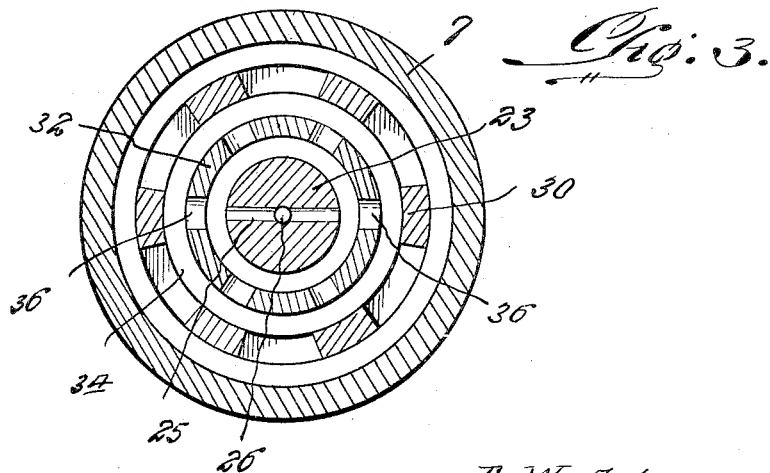

In the drawings forming part of this application, like numerals of reference indicate similar parts in the several views, and wherein:

Figure 1 is a vertical cross section of my improved shock absorber, the movable elements thereof being shown in their normal position and before the springs of the vehicle have been compressed, and Figures 2 and 3 are detail cross sections upon the lines 2—2 and 3—3 respectively of Figure 1, and looking downwardly in the direction of the arrows.

Referring to the drawings in detail, the device embodies a main casing 5 that comprises a hollow head, which head as more clearly shown in Figure 2 is substantially square shape in cross section. Pendent upon this hollow head 6 is a cylinder 7, and between said cylinder and head 6 is an inwardly directed flange 8.

Formed on one side of the head 6 are oppositely extending ears 9 that are formed with transverse openings 10, for the reception of bolts, rivets or the like, whereby the device may be advantageously secured to the frame bars of a vehicle.

Within the head 6 and formed upon one side wall thereof is a transverse enlargement 11, that is formed with a central pocket or cut out 12. At one side of this pocket or cut out 12 within said enlargement 11 is a socket 13, within which is a bearing sleeve 14, this bearing sleeve receiving one end of a rock shaft 15. The portion of this rock shaft 15 that is within the pocket or cut out 12 of the enlargement 11 is a hexagon as at 16, it being noted that the portion of said rock shaft on the opposite side of said hexagon portion extends through a screw threaded bushing 17 that is received within a screw threaded opening in one side of said enlargement 11. The bushing 17 terminates in a flange 18 outwardly of said head 6, and the portion of the rock shaft extending outwardly of said sleeve has keyed thereto as at 19, one end of a link 20, this link being connected in any manner desirable to the axle of the motor vehicle.

The lower end of the cylinder 7 is reduced and internally screw threaded at 21, for receiving the screw threaded skirt portion of what may be termed an enclosure cap 22. Formed centrally upon this closure cap 22, and extending within said cylinder 7 is a round shaped head 23, the upper end of the same being formed with an oil passage 24, that has communication at its lower end with laterally extending oil passages 25. The ends of these passages have communication with the interior of said cylinder 7. In alinement with the said oil passage 24 is a screw threaded bore for receiving a valve screw 26, the inner end of this screw being of conical form, and adapted for engaging within the lower end of said passage 24, for cutting off or adjusting the flow of oil between the passages 24 and 25, it being noted that this valve screw 26 is provided with a thumb knob 27. Within the cylinder 7 is a removable cylinder 28, the outer wall thereof being spaced inwardly from the interior wall of said cylinder 7, the inner wall of the cylinder 28 being in alinement with the edge of said inwardly extending flange 8, between the head 6 and cylinder 7. The upper end of this cylinder 28 terminates in an outwardly extending flange 29, while formed upon the lower end of said cylinder are spaced supporting legs 30, the inner edges of these legs being slightly outward of the inner wall of the cylinder 28, for providing a flange 31, upon the lower end of this cylinder, and for purposes hereinafter more clearly described.

Between the cylinder 28 and head 23 is a valve sleeve 32, the upper end of the same being formed with an inwardly extending flange 33 that rests upon the upper end of said head 23, when the same is in its downward limited movement. The lower end of this valve sleeve 32 terminates in an outwardly directed flange 34 that contacts with the flange 31 upon the lower end of said cylinder 28 for limiting the upward movement of said valve sleeve. The cylinder 28 is provided at its lower end with an annular row of oil passages 35, while said valve sleeve 32 at a point substantially intermediate its ends is also formed with an annular row of oil passages 36, these passages of said valve sleeve being out of alinement with the oil passages 35 in the cylinder 28 when the said valve sleeve is in its downward limited movement, these passages registering with each other when the said sleeve has been raised within the cylinder 28.

Freely movable within said cylinder 28 and above the sleeve 32 is a piston 37, the upper end of the same having pivotal connection to one end of a link 39, the upper end of this link 39 being pivotally connected at 40 to one end of an arm 41. The opposite end of this arm is formed with a transverse hexagon sleeve 42 that is positioned over the said hexagon portion 16 of the rock shaft 15, whereby through the instrumentality of the connecting means from the vehicle axle to the arm 20, this shaft 15 is rocked when the springs of the vehicle are compressed for consequently raising the piston 37 within said cylinder.

The head 6 of the casing 5 is provided with an oil inlet port 43 which is internally screw threaded for receiving a plug 44. It is of course to be understood that oil or other fluid is to be placed within said casing, the oil level being generally at the point shown by the dotted lines $a$ in Figure 1.

The front of the cylinder 28 may be and preferably is castellated for permitting the passage of oil to the space between the walls of the cylinders 7 and 28, and when the several movable elements are in the position of Figure 1, and the piston 37 is moved upwardly in a manner just described, a partial vacuum will be formed between the piston and said sleeve valve 32 for consequently raising this sleeve valve, incidental to the movement of the piston which will occasion the registering of the ports 35 and 36. As soon as these ports register oil is drawn in around the legs 30 of the cylinder as well as through said ports 35 and 36 over the head 23 through the sleeve valve 32 into the chamber between the piston and said sleeve valve, it of course being understood that this sleeve valve is limited in its upward movement. This action permits a free upward movement of the piston within the cylinder, but as soon as the springs start their rebound and upon a slight downward movement of the piston, the sleeve valve 32 is immediately forced back into the position shown in Figure 1, and the oil within the chamber between said sleeve valve and piston, will have a comparatively slow movement through the passages 24 and 25, and for consequently preventing the quick downward movement of the cylinder, for thereby preventing the quick rebounding of said springs.

In the manufacture of my device it is preferable that the casing 5 comprising the head for the cylinders 6 and 7 respectively, be formed of aluminum, the end cap 22 also consisting of the same material, the sleeve valve 32 being preferably of brass, while the piston 37 is of brass or iron.

In view of the above description, it will at once be apparent, that I have provided a highly improved form of shock absorber, the nature of the same being such as to permit the same to be readily disassembled for repairing or replacing any worn or broken parts and although I have herein shown and described the preferred embodiment of the present invention, it is nevertheless to be understood that I do not limit myself to what is herein shown and described, and that minor changes may be made therein, without departing from the spirit and scope of the invention as claimed.

Having thus described my invention, what I claim as new, and desire to secure by Letters Patent, is:—

In a shock absorber of the class described, a casing embodying a head and cylinder portion adapted to receive a supply of oil, said cylinder being open at its lower end, and provided with a removable cap, a head formed centrally upon said cap and extending within said cylinder, the upper end of said head being provided with an oil passage terminating at its lower end with laterally extending oil passages that communicate with the interior of said cylinder, a cylinder within said first mentioned cylinder and spaced therefrom, the lower end of the same being provided with oil passages, a sleeve valve also formed with oil passages, and positioned between said cylinder and said head, a piston movable within said cylinder, means for actuating said piston, said sleeve valve adapted to be raised when said piston is raised for alining the oil passages of said sleeve valve and cylinder for permitting the free upward movement of said piston, said sleeve valve adapted to be forced downwardly upon the reverse movement of said piston, for forcing the oil through the passages within said head, and means for adjusting the supply of oil through the passages in the head.

In testimony whereof I affix my signature.

ERNEST W. ACKERMAN.